June 18, 1940.   H. L. SWAN   2,204,738
RESUSCITATOR
Filed Aug. 15, 1938

Harry L. Swan
INVENTOR.

BY C. A. Snow & Co.
ATTORNEYS.

UNITED STATES PATENT OFFICE 2,204,738

RESUSCITATOR

Harry L. Swan, Lake Village, Ark.

Application August 15, 1938, Serial No. 225,059

3 Claims. (Cl. 128—28)

This invention relates to resuscitators and is more especially an improvement upon the structure shown in my co-pending application filed March 31, 1938, Serial Number 199,241.

An object of the invention is to provide a resuscitator of increased efficiency for use in producing artificial breathing.

A further object is to provide a valve arrangement whereby the resuscitator can be caused to adhere tightly to the body of the patient through the creation of a partial vacuum in the resuscitator, means being provided whereby this intimate contact of the resuscitator with the body of the patient is maintained during successive strokes of the device while artificial respiration is being effected.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

Figure 1:
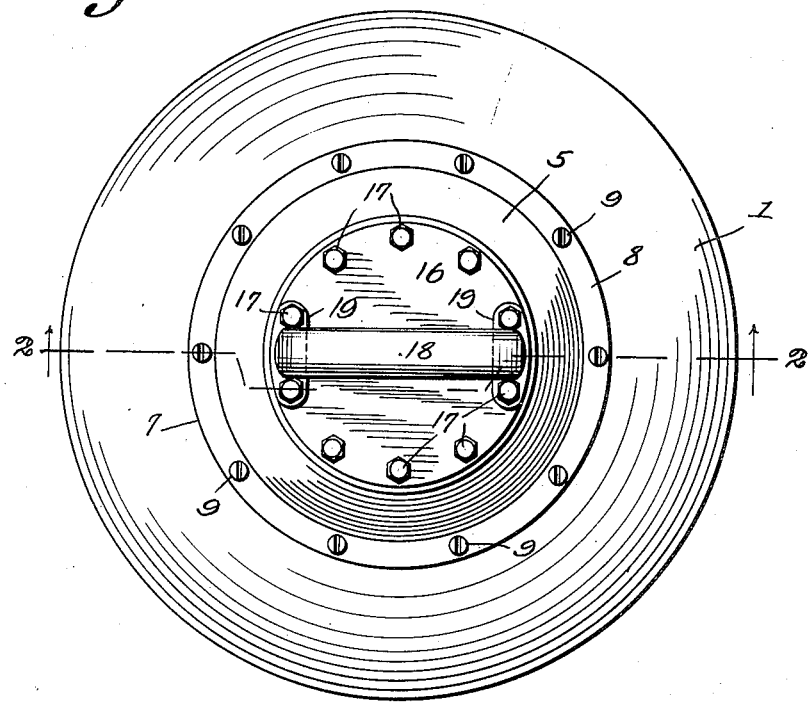
Figure 1 is a top plan view of the device.
Figure 2:
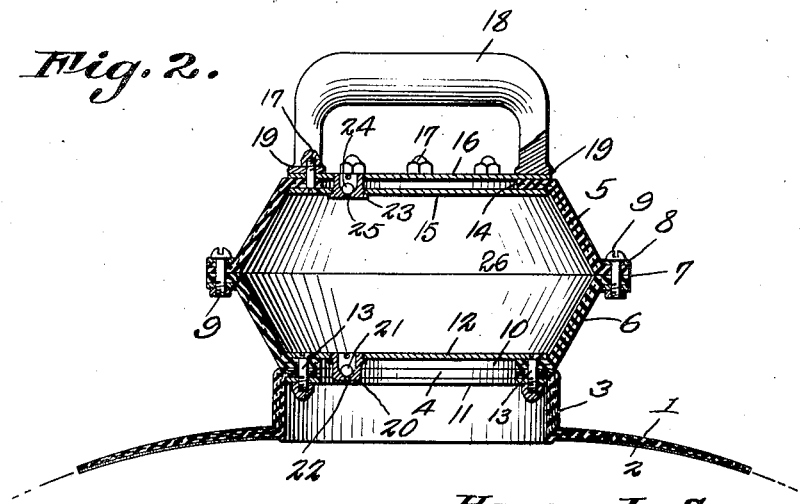
Figure 2 is a section on line 2—2, Figure 1.

Referring to the figures by characters of reference 1 designates a base of flexible rubber or the like preferably circular and which, if desired, can be provided with a bottom coating 2 of an adhesive although it is not essential to use the same. This base is preferably reenforced with a fabric and is provided with a concentric sleeve 3 having an inturned annular flange 4.

Mounted on the flange 4 is a pump comprising opposed frusto-conical members 5 and 6 having annular flanges 7 at their meeting or large ends, these flanges being interposed between rings 8 which, in turn, are connected by bolts 9 extending through the flanges. The lower end of the lower member 6 has an inturned annular flange 10 resting on the flange 4 and these two flanges 4 and 10 are interposed between a ring 11 and a disk 12 which are joined by bolts 13 whereby the flanges are gripped together tightly.

The upper or small end of member 5 has an inturned annular flange 14 and this flange is gripped by superposed disks 15 and 16 connected by bolts 17 which extend through the flange. Thus the parts are held together securely. A handle 18 is mounted on the upper or outer disk 16 and is formed with attaching plates 19 bolted to the disk 16 as shown in Figure 1.

A valve casing 20 is supported by and opens through the disk or plate 12 and carries a check valve 21 which is normally maintained by gravity in position to close the opening 22 in the bottom of the valve casing. Another check valve casing 23 is mounted within the disks 15 and 16, the check valve 24 in the casing being normally seated by gravity where it will close the opening 25 in the casing.

The resuscitator herein described is always ready for instant use. When it is desired to treat a patient, the base 1 is applied to the body at the proper point, and handle 18 is thrust downwardly toward the patient. This will cause the suction chamber 26 formed by the pump members 5 and 6, to collapse, air escaping therefrom past the upper valve 24. The handle 18 is then pulled upwardly and this will result in sucking air from under the base 1 and out of the sleeve 3 so that a partial vacuum will be set up sufficient to hold base 1 pressed against the body of the patient by air pressure. Thus the device will be maintained in proper position and this vacuum will be maintained when handle 18 is again pushed downwardly for the purpose of collapsing chamber 26. Thus a strong vacuum will be maintained and as the handle is thrust downwardly and pulled upwardly, an artificial breathing will be effected without danger of the device becoming unseated. Therefore the artificial breathing can be kept up uninterruptedly as long as desired.

It will be noted that all of the parts are detachably connected so that any of them can readily be removed and replaced with a new one.

What is claimed is:

1. A resuscitator for application to a patient, comprising a resilient base having a sleeve extending therefrom, and means for creating a vacuum in the sleeve to hold the base to the patient to which it is applied, said means comprising a pump mounted on the sleeve and including a collapsible chamber, a check valve connection between said chamber and sleeve for maintaining a vacuum in the sleeve after the withdrawal of air therefrom by the pump, a check valve carried by the pump for permitting escape of air to the atmosphere from the pump, and a handle mounted on the pump for use in effecting a thrusting and pulling action on the base and its sleeve without reducing the vacuum created in the sleeve while applied to a patient.

2. A resuscitator including a resilient base for application to a patient, a sleeve upstanding therefrom, and means carried by the sleeve for exhausting air therefrom, maintaining a partial vacuum in the sleeve to hold the base to the patient, and transmitting a pulling and thrusting action to the sleeve and base without breaking the vacuum in the sleeve, said means including opposed connected flexible members constituting a collapsible chamber, a valved connection between said chamber and the sleeve positioned to prevent breaking of the vacuum in the sleeve during the collapse of the chamber, a valved connection between said chamber and the external atmosphere, and a handle for collapsing the chamber and pulling upon the base and sleeve.

3. A resuscitator including a flexible base for application to the body of a patient, an upstanding sleeve opening through the base, said sleeve having an inturned annular flange, opposed upper and lower collapsible members detachably connected at their meeting ends and providing a collapsible chamber, a lower valved disk mounted within the lower member, means cooperating with said disk for binding said lower member to the sleeve to effect an air-tight connection, an upper valved disk mounted on the upper member of the chamber, means cooperating with the upper disk for binding it to said upper member to form an air-tight connection, and a handle carried by said upper disk, said valves being positioned to prevent flow of air into the chamber from the outer atmosphere and into the sleeve from the chamber.

HARRY L. SWAN.